United States Patent [19]
Stockton et al.

[11] Patent Number: 5,687,635
[45] Date of Patent: Nov. 18, 1997

[54] OPTO-ELECTRONIC LEVEL SENSOR

[75] Inventors: Donald R. Stockton, Seal Beach; Michael C. Martin, Canyon Lake, both of Calif.

[73] Assignee: Composite Specialties, Inc., Corona, Calif.

[21] Appl. No.: 498,084

[22] Filed: Jul. 5, 1995

[51] Int. Cl.[6] .............................. A47J 31/00; G01N 21/85
[52] U.S. Cl. ............................. 99/281; 99/285; 250/577
[58] Field of Search .......................... 99/285, 280, 281; 250/577, 574; 340/619; 73/290 R, 293, 327

[56] References Cited

U.S. PATENT DOCUMENTS

| | | | |
|---|---|---|---|
| 4,122,763 | 10/1978 | Waninger et al. | 99/281 |
| 4,246,489 | 1/1981 | Yoshida et al. | 259/577 |
| 4,247,784 | 1/1981 | Henry | 250/577 |
| 4,309,939 | 1/1982 | Stover | 99/280 |
| 4,524,282 | 6/1985 | King | 250/577 |
| 5,194,747 | 3/1993 | Culpepper et al. | 250/577 |

*Primary Examiner*—Reginald L. Alexander
*Attorney, Agent, or Firm*—G. Donald Weber, Jr.

[57] ABSTRACT

20 Claims, 2 Drawing Sheets

FIG. 6

OPTO-ELECTRONIC LEVEL SENSOR

BACKGROUND OF THE INVENTION

1. Field of the Invention

This invention relates to an apparatus and method for detecting the level of a liquid in a container, in general, and to such an apparatus which detects the liquid level through non-intrusive means of measuring light reflected from the liquid surface, in particular. More specifically, this invention relates to a housing cover that mates with a standard vessel in a beverage brewing machine and includes an opto-electronic level detecting and sensing device which comprises a light emitting device and a light detecting device.

2. Prior Art

There have been various techniques for determining the level of a liquid in vessels or containers. One group of techniques involves mechanically measuring the levels with float indicators, dip sticks, probes or the like which extend into the liquid to be measured.

U.S. Pat. No. 2,502,844; J. R. Hildreth. This patent describes a device which integrates a tube into the upper bowl of a coffee maker.

U.S. Pat. No. 3,120,125; A. W. Vasel. The patent describes a device which inserts optical fiber bundles into the liquid container to measure various levels of the liquid.

U.S. Pat. No. 4,873,863; J. D. Bruhl. This patent describes a device which inserts a probe into the liquid container vessel, suspending it just above the surface of the liquid to detect leaks.

However, these intrusive techniques have many shortcomings. For example, all of these techniques make physical contact with the liquid contents and/or intrude into the vessel. Therefore, corrosion is always a possible problem; contamination of the liquid is always a concern; and cleaning and maintenance is time consuming and expensive.

In addition, because the liquid is subject to incidents of "waves" or variations in the level within the container due to banking (in an aircraft) or sudden acceleration or deceleration (trains or buses), the electrode probes are subject to incorrect analysis of liquid levels and, therefore, false readings. Thus, it is an object of the present invention to provide an improved liquid level detector that avoids the disadvantages of existing intrusive electrode probe device technology used in prior systems.

Recently, lasers have been used to detect liquid levels in containers.

U.S. Pat. No. 5,194,747; W. X. Culpepper. This patent describes a device which uses a laser beam for liquid level detection.

The inherent problem with laser technology in this area is that the laser beam is extremely narrow and requires precise alignment for level detection. Moreover, the beam tends to be reflected thereby providing false data. Also, the technology is very expensive.

SUMMARY OF THE INVENTION

A level sensing and control apparatus suitable for monitoring the level of a liquid in a container. One application of the apparatus is in modular beverage makers on airplanes, trains, buses, or other similar vehicles. The apparatus includes a support for an optical sensor system. The support is adapted to be mounted on the container. The optical system includes an Infra-Red Emitting Diode (IRED) and two silicon phototransistors. The IRED produces a beam of infra-red light which is reflected from a surface of a liquid within the container. One of the phototransistors monitors infra-red light reflected from the liquid. The other phototransistor directly monitors the IRED beam for power degradation and provides interrupt control as required. The reflected beam is detected over a narrow, but abrupt, power bandwidth to supply liquid level control circuits with information about the liquid level in the container. Mechanical spacing, angle, and focus of the phototransistors in the housing are designed to maximize background discrimination.

One important advantage of the invention is that the non-intrusive opto-electronic liquid level detection system identifies near empty and near full liquid levels while requiring little or no periodic alignment maintenance by a service technician.

Other advantages of the invention are that the liquid level detection system mounts directly onto the lip of a conventional beverage maker vessel; it is easily secured in place and removed; it has no probes extending into the liquid vessel which make installation or removal difficult; and it is easily maintained and cleaned.

Another advantage of the invention is a secondary detection device that monitors the output of the light source and prevents the beverage maker from being operative unless the light source is emitting sufficient light to assure accurate detection of the liquid level.

Another feature of the invention is the provision of ports and grooves in the sensor housing which mate with the beverage maker vessel lid to avoid spilling, permit the escape of steam or other vapors and permit the dispersement of condensation which may form around the light source and the detectors.

Another advantage of the invention is the provision of protection circuits in the form of fast acting circuit breakers and a non-resetable SCR circuit for reacting to undesirable operating conditions in the beverage maker.

Another advantage of the invention is a liquid level detection system that is relatively inexpensive, simple, accurate and reliable in operation.

BRIEF DESCRIPTION OF THE DRAWINGS

Throughout the Figures, similar parts and similar functions have similar reference numbers.

DESCRIPTION OF A PREFERRED EMBODIMENT

Figure 1:
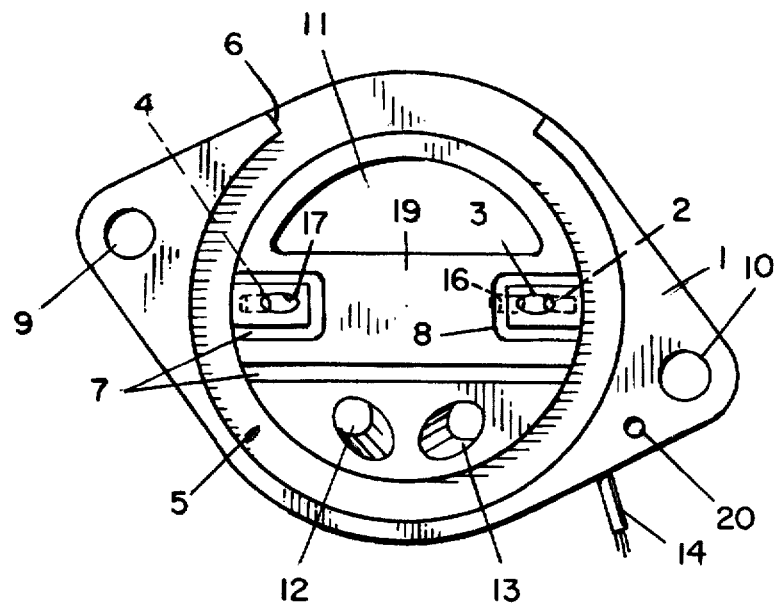
FIG. 1 is a plan view of the bottom surface of one embodiment of the opto-electronic level sensor housing of the instant invention.

Referring now to FIG. 1, there is shown a plan view of the lower surface of the opto-electronic level sensor housing 1.

In this embodiment, the housing 1 has a generally elliptical configuration. The housing is fabricated of a slab of aluminum, for example, which is, typically, about ½ inch thick. Typically, the housing is anodized to be black on both surfaces to inhibit undue reflection of the light beam from the infra-red emitting diode (IRED) 2 described infra.

Holes 9 and 10 are provided in the respective ends of the housing 1 for mounting thereof in a conventional beverage maker (e.g. coffee brewer) used in vehicles, in particular, airplanes.

A large aperture 11, generally hemispherical in configuration, passes through the housing 1. Aperture 11 is provided to permit the escape of steam and dispersement of condensation from the vessel on which the housing 1 is mounted.

A pair of smaller apertures 12 and 13 pass through the housing 1. The apertures 12 and 13 are in the opposite half of the housing 1 relative to the large aperture 11. The apertures 12 and 13 are provided for the admission of water to a vessel located below the housing in a typical application of the invention.

The mid-portion 19 of housing 1 is located between the large aperture 11 and the smaller apertures 12 and 13. The IRED 2, the fail-safe monitor phototransistor 3 and the level sensor phototransistor 4 are mounted in the mid-portion 19. In particular, the IRED 2 is mounted in a slot 15 at the right edge (in this embodiment) of the mid-portion or section 19. The slot 15 is angled to cause IRED 2 to project a light beam toward the center of the vessel on which the housing 1 rests.

The phototransistor 3 is mounted in slot 16 adjacent to slot 15. Slot 16 is angled so that phototransistor 3 monitors the light beam projected by IRED 2. The slots 15 and 16, in this embodiment, are joined at the ends adjacent the top surface of housing 1 to form a single aperture. Of course, separate apertures are contemplated.

The detector phototransistor 4 is mounted in slot 17 at the left edge (in this embodiment) of housing section 19. Slot 17 is angled to cause the detector 4 to "view" the interior of the vessel. Thus, phototransistor 4 can detect the light beam from IRED 2 when the light beam is reflected from the surface of the liquid in the vessel.

The wire bundle 14 comprises the wires which are connected to the IRED 2, the monitor 3 and the detector 4. The wires are connected to control circuitry in the beverage maker unit.

The housing 1 includes a groove 5 in the bottom surface thereof. The groove 5 engages the top lip of a standard beverage maker vessel (not shown). The groove 5 of the housing 1 is dimensioned to securely seal the vessel to inhibit spilling of liquid from the vessel. A vented edge 6 on the front of the housing 1 communicates with groove 5 to allow mating with the vessel handle. The U-shaped grooves 7 and 8 around the IRED 2 and phototransistors 3 and 4 communicate with groove 5 to vent steam and other vapors away from these devices thereby to prevent condensation from clouding the light source or the sensors.

Figure 2:
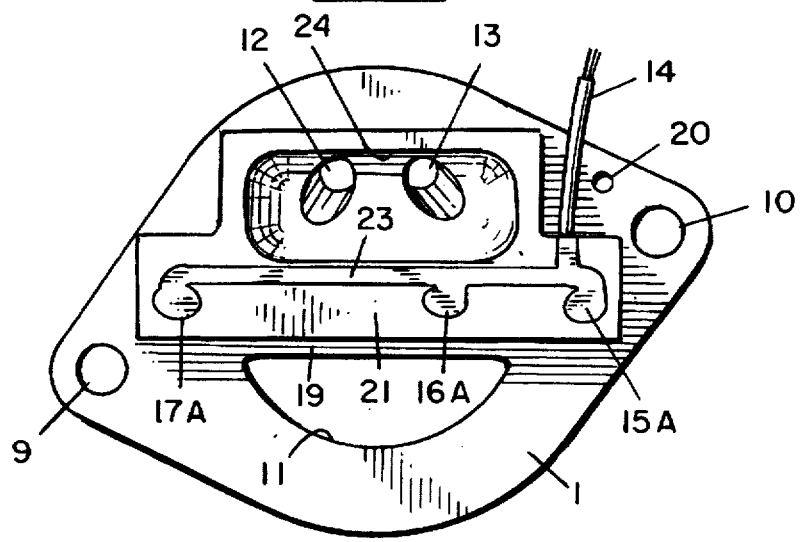
FIG. 2 is a plan view of the top surface of the embodiment shown in FIG. 1.

Referring now to FIG. 2, there is shown a plan view of the top surface of the housing 1. A raised body 21 is formed on or mounted to the upper surface of mid-housing section 19. The upper ends of the apertures 15, 16 and 17 are shown as cavities 15A, 16A and 17A. These cavities are joined together by an elongated cavity 23 in which the wires in bundle 14 are placed. These wires are connected to the IRED 2, the monitor 3 and the detector 4, respectively. To maintain the various components in place, a suitable material such as an epoxy, is placed in the cavities 15A, 16A, 17A and 23.

This epoxy hardens to form a secure protective coating for the internal components. Thus, the hardened epoxy 15 holds the IRED 2 and the phototransistors 3 and 4 securely in alignment ensuring the same relative position in reference to the liquid in the beverage maker vessel, and protects them from beverage vapors or moisture.

The apertures 12 and 13 pass through the housing 1 and the raised body 21. A large cavity 24 surrounds the aperture 12 and 13. The large cavity 24 operates as a funnel for guiding input water from a suitable reservoir into the brewing vessel. Thus, precise alignment of the housing with the water inlet is not critical.

Figure 3:
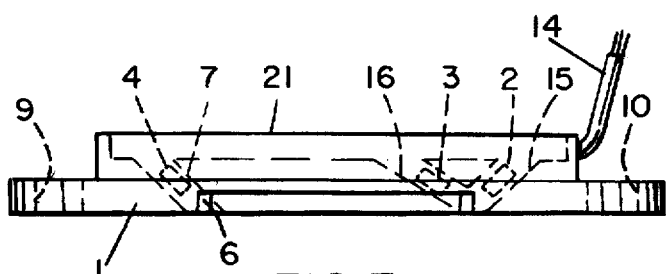
FIG. 3 is an end view of the embodiment shown in FIGS. 1 and 2.

Referring now to FIG. 3, there is shown an elevation view of one embodiment of the invention. The raised body 21 is shown atop housing 1 with the wire bundle 14 extending therefrom. The gap 6 of the housing 1 is shown. The openings 9 are shown in phantom at the ends of housing 1. The IRED 2, the monitor 3 and the detector 4 are shown in dashed outline as are the apertures 15, 16 and 17.

Figure 4:
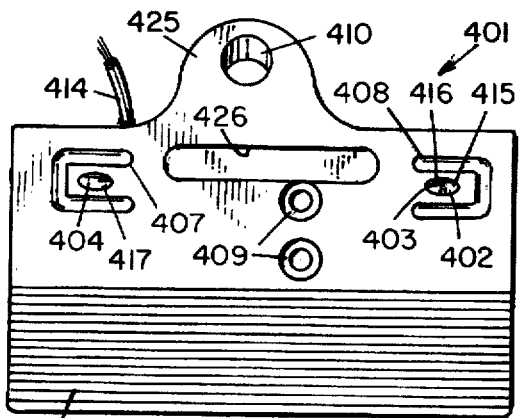
FIG. 4 is a plan view of the bottom surface of another embodiment of the opto-electronic sensor housing of the instant invention.

Referring now to FIG. 4, there is shown a bottom plan view of another embodiment of the instant invention. This embodiment is used with a different vessel retention technique when it is impractical to have contact with the vessel.

In this embodiment, the housing 401 is, generally, rectilinear in configuration. The apertures 415, 416 and 417 are equivalent to the apertures 15, 16 and 17 in the embodiment shown in FIGS. 1, 2 and 3. Likewise, the IRED 402, the monitor 403 and the detector 404 are similar to the counterpart components described supra. These components are mounted in the apertures 415, 416 and 417, respectively.

The mounting holes 409 are located near the center of housing 401 to enable mounting of the unit of this embodiment with the beverage brewing apparatus.

The fill aperture 410 is arranged in an extended tab 425 which is formed at the front center of housing 401. The aperture 410 is angled to provide better communication between the liquid source and the beverage vessel. The U-shaped grooves 407 and 408 around IRED 402, phototransistors 403 and 404 and groove 426 prevent steam and condensation from clouding the light source or the sensors.

The wire bundle 414 extends from the rear edge of the housing 401.

In order to accommodate the configuration of the brewing apparatus, the housing 401 of this embodiment has a sloped rear portion 420 on the bottom surface. The sloped portion is thinner near the edge of the housing 401 than it is at the middle thereof.

Figure 5:
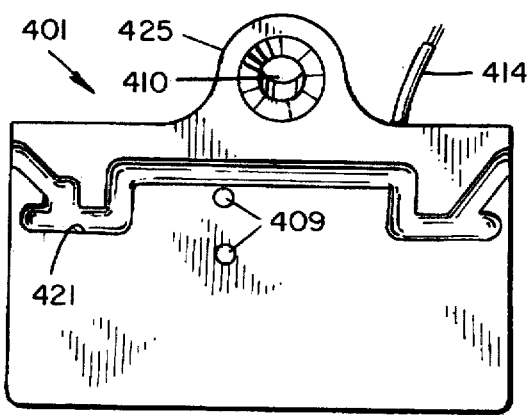
FIG. 5 is a plan view of the top surface of the embodiment shown in FIG. 4.

Referring now to FIG. 5, there is shown a plan view of the top surface of housing 401. The apertures 409 and 410 which pass through the housing 401 are shown. A groove 421 is configured to communicate with the apertures 415, 416 and 417, as well as to receive the wires in bundle 414. The epoxy described supra is used to fill the groove 421 as described relative to the embodiment of FIGS. 1, 2 and 3.

Figure 6:
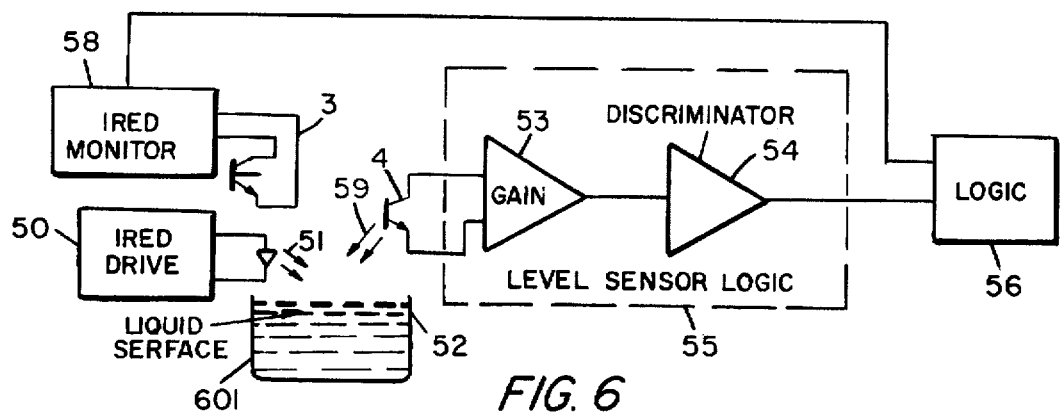
FIG. 6 is a simplified block diagram of the overall opto-electronic sensor system.

Referring now to FIG. 6, there is shown a functional block diagram of the circuitry of the instant invention. In a preferred embodiment, the IRED drive circuit 50 includes a power source which provides an appropriate drive current to the IRED 2. The IRED 2 emits an infra-red light beam 51, the pattern of which spreads by the cube root function. This narrow, but abrupt, power bandwidth beam will reflect off the surface 52 of any liquid in the beverage maker vessel 601. The reflected light 59 is detected by phototransistor 4. The resulting current from the detector phototransistor 4 is amplified by amplifier 53. The amplified signal is applied to discriminator circuit 54 in the level sensor logic circuit 55. The discriminator circuit 54 determines if the signal from amplifier 53 represents reflected light within a preset threshold level or not. The discriminator circuit also determines whether that level indicates a "full" vessel or a "nearly empty" vessel.

The decision logic 56 (see FIG. 7 for detail) compares the signals from the level sensing logic 55 with other sensed parameters from both the sensor and the beverage maker to determine if a "BREW" cycle will begin, continue, or be terminated within the beverage maker system.

The monitor phototransistor 3 monitors the infra-red light output of the IRED 2. The output from the phototransistor detector 3 is analyzed by the IRED monitor 58 to determine that the IRED 2 is functioning properly. The primary test is to determine that the IRED is, in fact, emitting light. Next the monitor 58 determines that the emitted light is within prescribed parameters. For example, if the light level is too bright, a condition exists which could result in not detecting a nearly empty vessel. Conversely, if the light level is too weak, a condition could result in not detecting a full vessel.

The output signals from the IRED monitor 58 are supplied to the decision logic 56 where other signals representative of other parameters are received. These signals represent parameters such as over temperature protection and/or circuit breaker failure protection. These conditions are considered by the system in order to make a decision whether to start, continue, stop, or disallow a "BREW" cycle, as well as to allow the hot water heating elements to energize or not.

Figure 7:
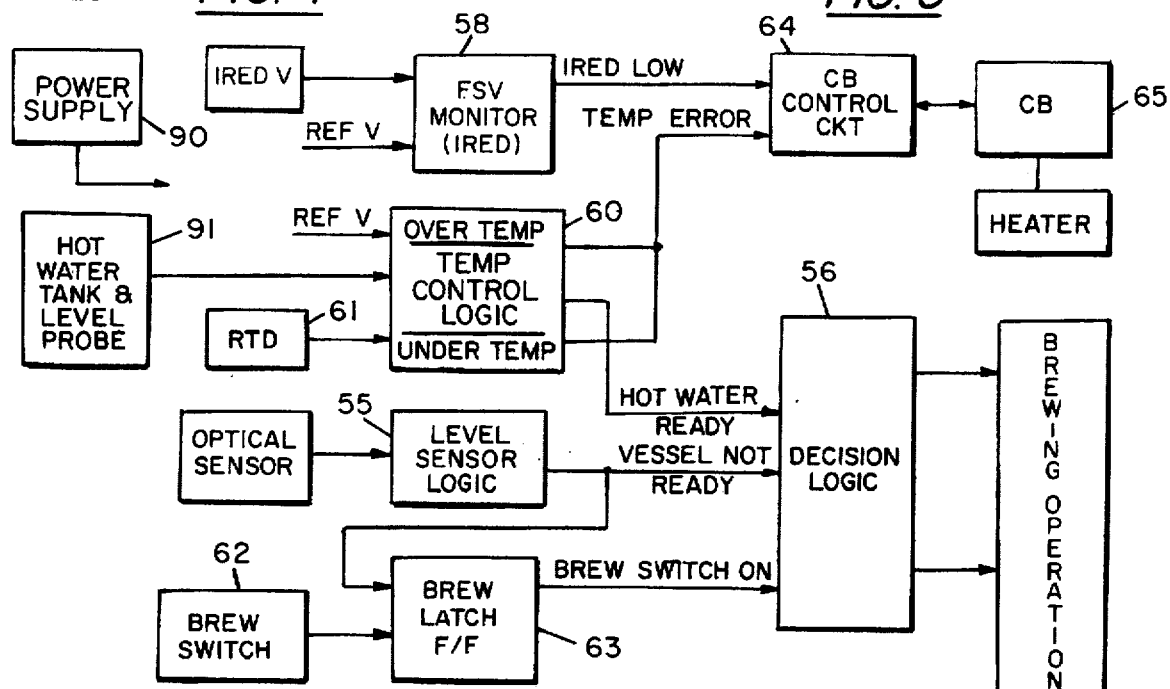
FIG. 7 is a simplified block diagram of the opto-electronic sensor electronics.

Referring now to FIG. 7, there is shown a block diagram of the control circuitry which controls the beverage maker system. This circuitry is adapted to incorporate and operate on the conventional and/or existing beverage maker system in conjunction with the instant invention. That is, the circuitry of this invention has a "plug-in" retro-fit capability with existing systems. Thus, many of the input signals are obtained from the existing devices or systems.

Thus, in order for a command to start a "BREW" cycle to be accepted and operated upon by the system, several conditions must be met. These conditions are established by the circuitry shown in FIG. 7 which includes components from the brewer system which are not part of the invention, per se.

Typically, a power supply 90 provides the appropriate voltages to the system. In the preferred embodiment, the power supply provides 28 volt and 12 volt signals for this circuit.

A master circuit breaker control circuit 64 is provided. The circuit 64 may include a silicon controlled-rectifier circuit to selectively trip a circuit breaker to completely disengage the brewer system in the event of a significant malfunction.

For example, the IRED monitor 58 (see also FIG. 6) will produce a signal to trip the circuit breaker 64 in the event that the IRED 58 is not supplying sufficient radiation to properly monitor the liquid level in the brewer vessel. That is, the monitor 58 compares a voltage produced by the transistor detector 3 with a fail safe reference voltage derived from the power supply via a voltage divider network.

In addition, the temperature control logic circuit 60 monitors the resistive temperature device (RTD) 61 in the hot water tank 91 of the brewing system. The water must be sufficiently hot (i.e. about 193°±3° F.), but should not exceed 244° F. The temperature control logic circuit 60 comprises a voltage signal from the RTD 61 with a reference voltage provided by a voltage divider network connected to the power supply 90 and supplies a signal to the control circuit 64 when the temperature control logic circuit 60 detects "over temperature" or "under temperature" conditions. Detection of either of these conditions causes the circuit breaker to be activated and terminate operation of the system.

Of course, it must be understood that the temperature control logic circuit 60 also produces a signal (i.e. hot water ready) which indicates that the temperature of the water in the supply tank 91 is within limits. This signal is supplied to the decision logic circuitry 56.

Assuming that the circuit breaker 64 has not been tripped, in order to initiate a BREW operation, the BREW switch 62 must be turned "ON" to enable the brew latch flip-flop circuit 63. The flip-flop circuit 63 (typically an RS flip-flop circuit) supplies a signal to the decision logic circuit 56 along with the temperature monitor circuit 60.

Likewise, the level sensor logic 55 must ascertain that the liquid vessel on the beverage machine is proper, i.e. the vessel is not completely full. The level sensor logic 55 obtains an input signal from the optical sensor 51 which includes phototransistor detector 4 (See FIG. 6). The level sensor logic circuit provides a signal to the decision circuit 58 and to the flip-flop circuit 63 to reset the BREW latch when the vessel is full.

If the BREW switch is activated, the water level is proper, and the water temperature is proper (i.e. the circuit breaker is still closed), the decision logic circuit 58 will allow a BREW cycle to commence. Of course, if any failure condition is detected, a BREW cycle will be prevented from commencing.

Such failure conditions occur if the IRED monitor 58 detects that the infra-red emission from the IRED is either too high or too low; if the water is too hot or too cold (i.e. frozen); and/or if the vessel is full and cannot accept any additional water input. Of course, other back up mechanisms can be provided in the vessel circuit, as well. For example, a snap disk can be included in the circuit to open, thereby disabling the heater elements and not allowing them to be reactivated until maintenance has repaired the defective over temperature protection circuit breaker 64.

The decision logic circuit 56 is, effectively, the control logic circuitry of the opto-electronic sensor system of the instant invention. The decision logic circuit 56, based upon the signal supplied thereto, determines whether the BREW cycle should commence or not. The decision logic circuit 56, if not inactivated for any of the reasons noted above, produces command signals to the appropriate components of the conventional beverage brewing system. These command signals turn on appropriate lights on the system panel to inform the user of the system status. Also, appropriate brewing operations are initiated, for example, water is heated, supplied to the brewer, stored in the beverage vessel and so forth. However, as can be seen, the IRED level sensor of the instant invention is clearly an improvement over the prior art probes and similar sensors.

Thus, there is shown and described a unique design and concept of an apparatus and method for detecting the level of a liquid in a beverage maker. The particular configuration shown and described herein relates to a beverage level detector using light reflected from the surface of the liquid. While this description is directed to a particular embodiment, it is understood that those skilled in the art may conceive modifications and/or variations to the specific embodiments shown and described herein. Any such modi-

We claim:

1. In a beverage brewing apparatus having a vessel for retaining said beverage, a liquid level detector for detecting the level of the liquid in the vessel, a temperature monitor for sensing the temperature of said liquid, switch means for selectively initiating operation of said apparatus, decision logic means connected to receive signals from said liquid level detector, said temperature monitor and said switch means, and brewing means connected to receive a control signal from said decision logic means whereby said brewing means initiates a brewing function.

2. A liquid level sensor for detecting the level of a liquid within a vessel comprising, a housing means, a radiation source mounted in said housing means, a first detector means mounted in said housing means to detect radiation reflected from the surface of liquid in a vessel which is selectively situated below said housing and a second detector means mounted in said housing means to directly detect radiation emitted by said radiation source.

3. The sensor recited in claim 2 wherein, said radiation source comprises an infra-red emitting device (IRED).

4. The sensor recited in claim 2 wherein, said housing means includes at least one groove to engage a vessel situated therebelow.

5. The sensor recited in claim 2 wherein, said housing means includes at least one aperture therethrough to permit liquid to pass therethrough into the vessel.

6. The sensor recited in claim 2 wherein, said housing means is adapted to be connected to a beverage brewing apparatus in which the vessel comprises a beverage brewing pot used in the beverage brewing apparatus.

7. The sensor recited in claim 2 including, monitor circuit means connected to said second detector means for monitoring the level of radiation emitted by said radiation source.

8. The sensor recited in claim 7 including, circuit breaker means connected to said monitor circuit means whereby said circuit breaker means is activated when said radiation emitted by said radiation source is below a preset level.

9. The sensor recited in claim 6 wherein, said housing means is adapted to replace an existing cover device for a vessel used in a beverage brewing apparatus.

10. The sensor recited in claim 2 wherein, said radiation source produces radiation which has a spreading pattern.

11. The sensor recited in claim 2 wherein, each of said first and second detector means comprises a phototransistor.

12. The sensor recited in claim 2 wherein, said radiation source and both of said first and second detector means are mounted in apertures in said housing means.

13. The sensor recited in claim 12 wherein, said radiation source and said second detector means are mounted adjacent to a common aperture in said housing means.

14. The sensor recited in claim 12 wherein, said radiation source and both of said first and second detector means are potted in an epoxy in the respective apertures.

15. The apparatus recited in claim 1 including, liquid supply means for supplying liquid to said vessel.

16. The apparatus recited in claim 1 including, temperature control means connected to said temperature monitor producing output signals representative of said temperature.

17. The sensor recited in claim 2 including, brew control means for selectively initiating a brew operation relative to said vessel.

18. The sensor recited in claim 17 including, level sensor logic circuit means connected to said first detector means to selectively initiate operation of said brew control means in response to a prescribed signal from said first detector means.

19. The sensor recited in claim 16 wherein, said temperature control means includes temperature probe means mounted at said liquid supply means.

20. In a beverage brewing system including a vessel for brewing a beverage therein, liquid supply means for supplying liquid to said vessel, and a brewing control circuit for causing the brewing of a beverage in said vessel when the temperature and level of liquid in said vessel are within prescribed limits, the improvement comprising, a housing means, said housing means is adapted to be connected to said brewing control circuit, said housing means is adapted to replace an existing cover device for the vessel used in the beverage brewing system, said housing means includes at least one aperture therethrough to permit liquid to pass therethrough from said liquid supply means into said vessel, a radiation source mounted in said housing means, detector means mounted in said housing means to detect radiation reflected from the surface of liquid in a vessel situated below said housing, and level sensor logic circuit means connected to said detector means to selectively initiate operation of said brewing control circuit in response to a prescribed signal from said detector means.

* * * * *